(12) United States Patent
Stemper

(10) Patent No.: US 6,324,278 B1
(45) Date of Patent: *Nov. 27, 2001

(54) SWITCHED TELECOMMUNICATION NETWORK, METHOD OF ESTABLISHING A SWITCHED CONNECTION IN SUCH A NETWORK, AS WELL AS EXCHANGE AND ROUTING FACILITY THEREFOR

(75) Inventor: Peter Stemper, Gerlingen (DE)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/047,045

(22) Filed: Mar. 24, 1998

(30) Foreign Application Priority Data

Apr. 5, 1997 (DE) ............................................ 197 14 116

(51) Int. Cl.$^7$ ...................................................... H04M 7/00
(52) U.S. Cl. ................ 379/221.01; 379/219; 379/220.01
(58) Field of Search .................................... 379/219, 220, 379/221

(56) References Cited

U.S. PATENT DOCUMENTS 5,390,242   2/1995   Bales et al. .
5,649,108 * 7/1997   Spiegel et al. ........................ 709/241

FOREIGN PATENT DOCUMENTS 3626870   2/1987   (DE) .
4308512   9/1994   (DE) .
4428349   2/1996   (DE) .
0696147   8/1994   (EP) .

OTHER PUBLICATIONS

"Telekommunikationssysteme mit Leitweglenkung suchen die kostengunstigste Verbindung" by von Wlater Loffler, pp. 42–43 from Private Firmennetze.

* cited by examiner

Primary Examiner—Harry S. Hong
Assistant Examiner—Hector Agdeppa
(74) Attorney, Agent, or Firm—Ware, Fressola, Van Der Sluys & Adolphson LLP

(57) ABSTRACT

The invention relates to a switched telecommunication network with several exchanges (VStA, VStB, VStC, VStD, VStE) which are directly or indirectly interconnected such that at least between individual pairs of exchanges (VStA/VStE), more than two paths (VStA-VStB-VStE, VStA-VStC-VStE, VStA-VStD-VStE) are possible, and with at least one routing facility (ARU) which decides on the selection of the respective path to be used for each connection to be established and which does not select a path if it was blocked on the last attempt, the routing facility (ARU) being designed not to select a path if it is identical in sections (Mux-Mux) with a path which was blocked on the previous attempt, and to a method of establishing a switched connection in a switched telecommunication network, to an exchange, and to a routing facility therefor.

5 Claims, 2 Drawing Sheets

SWITCHED TELECOMMUNICATION NETWORK, METHOD OF ESTABLISHING A SWITCHED CONNECTION IN SUCH A NETWORK, AS WELL AS EXCHANGE AND ROUTING FACILITY THEREFOR

TECHNICAL FIELD

This invention relates to a switched telecommunication network comprising several exchanges which are directly or indirectly interconnected such that at least between individual pairs of exchanges more than two paths are possible, to a method of establishing a switched connection in a switched telecommunication network, to an exchange, and to a routing facility.

BACKGROUND OF THE INVENTION

Switched telecommunication networks are designed in such a way that the individual exchanges are more or less intermeshed. This means, on the one hand, that a connection can be established from any exchange of the network to any other exchange and, on the other hand, that as a rule, there is not only one possibility of routing the call, but more than one possibility, frequently three or more possibilities. This not only affords safety against disturbances but also results in a more uniform load distribution. There are many strategies to select an optimum possibility for each call attempt. In any case, at least the most recent attempts and their results are taken into account.

A problem arises from the fact that not all of the available possibilities are equivalent. On the one hand, individual ones of the possible paths are more expensive than others, and on the other hand, the capacities of the paths are partly very different.

SUMMARY OF THE INVENTION

The object of the invention is to provide a switched telecommunication network as well as suitable methods and components for further reducing the probability of unsuccessful call attempts.

This object Is attained by a switched telecommunication network comprising several exchanges which are directly or indirectly interconnected such that at least between individual pairs of exchanges, more than two paths are possible, and further comprising at least one routing facility which decides on the selection of the respective path to be used for each connection to be established and which does not select a path if it was blocked on the previous attempt, wherein the routing facility is designed not to select a path if the path is identical in sections with a path which was blocked on the previous attempt.

The object is also achieved by a method of establishing a switched connection in a switched telecommunication network comprising several exchanges which are directly or indirectly interconnected such that at least between individual pairs of exchanges, more than two paths are possible, and further comprising at least one routing facility which decides on the selection of the respective path to be used for each connection to be established and which does not select a path if it was blocked on the previous attempt, wherein the routing facility does not select a path if the path is identical in sections with a path which was blocked on the previous attempt.

The object is still further obtained by an exchange for a switched telecommunication network comprising several exchanges which are directly or indirectly interconnected such that at least between the exchange and another exchange, more than two paths are possible, and further comprising a routing facility which decides on the selection of the respective path to be used for each connection to be established and which does not select a path if it was blocked on the previous attempt, wherein the routing facility is designed not to select a path if the path is identical in sections with a path which was blocked on the previous attempt.

The object is also attained by a routing facility for a switched telecommunication network comprising several exchanges which are directly or indirectly interconnected such that at least between individual pairs of exchanges, more than two paths are possible, the routing facility being associated with at least one of the exchanges and designed to decide on the selection of the respective path to be used for each connection to be established and not to select a path even if it was blocked on the previous attempt, wherein the routing facility is designed not to select a path if the path is identical in sections with a path which was blocked on the previous attempt.

According to the invention, the fact that the paths between two exchanges are partly combined from a transmission point of view and then are jointly overloaded or even jointly disturbed is taken into account.

Further advantageous features of the invention are defined in the subclaims and will become apparent from the following description.

BRIEF DESCRIPTION OF THE DRAWINGS

The invention will now be explained in more detail with reference to the accompanying drawings, in which.

BEST MODE FOR CARRYING OUT THE INVENTION

Figure 1:
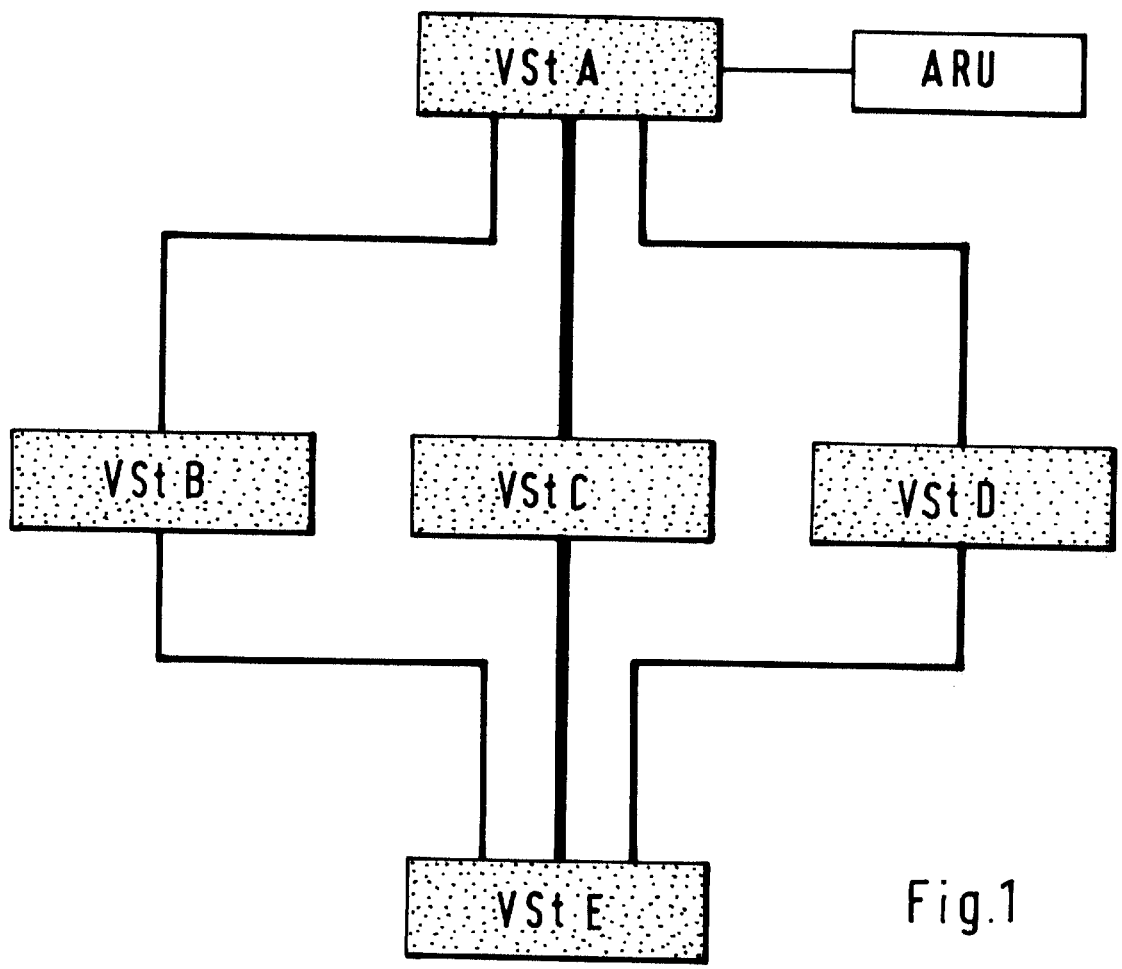
FIG. 1 shows a part of a switched telecommunication network according to the invention from a switching point of view.

First, the problem underlying the invention will be briefly explained again with the aid of FIG. 1. FIG. 1 shows a pair of exchanges VStA and VStE which can communicate via three different paths, namely via the exchanges VStB or VStC or VStD. Also shown in FIG. 1 is a routing facility ARU, which is connected to the exchange VStA. All these exchanges are also connected with other exchanges, and the exchanges VStB, VStC, and VStD may additionally be connected with one another. Thus, in principle, paths other than those shown are also possible between the two exchanges, for example the path from the exchange VStA via the exchange VStB and the exchange VStC to the exchange VStE.

Assuming that on each attempt to achieve a connection to the exchange VStE, the exchange VStA first tries to seize one of the three paths shown. A common procedure is not to select a path at least as a first trial if this path was blocked on the previous attempt. If, for example, the path via the exchange VStC was blocked on the previous attempt, the path via the exchange VStD, for example, will be selected next as a trial.

Figure 2:
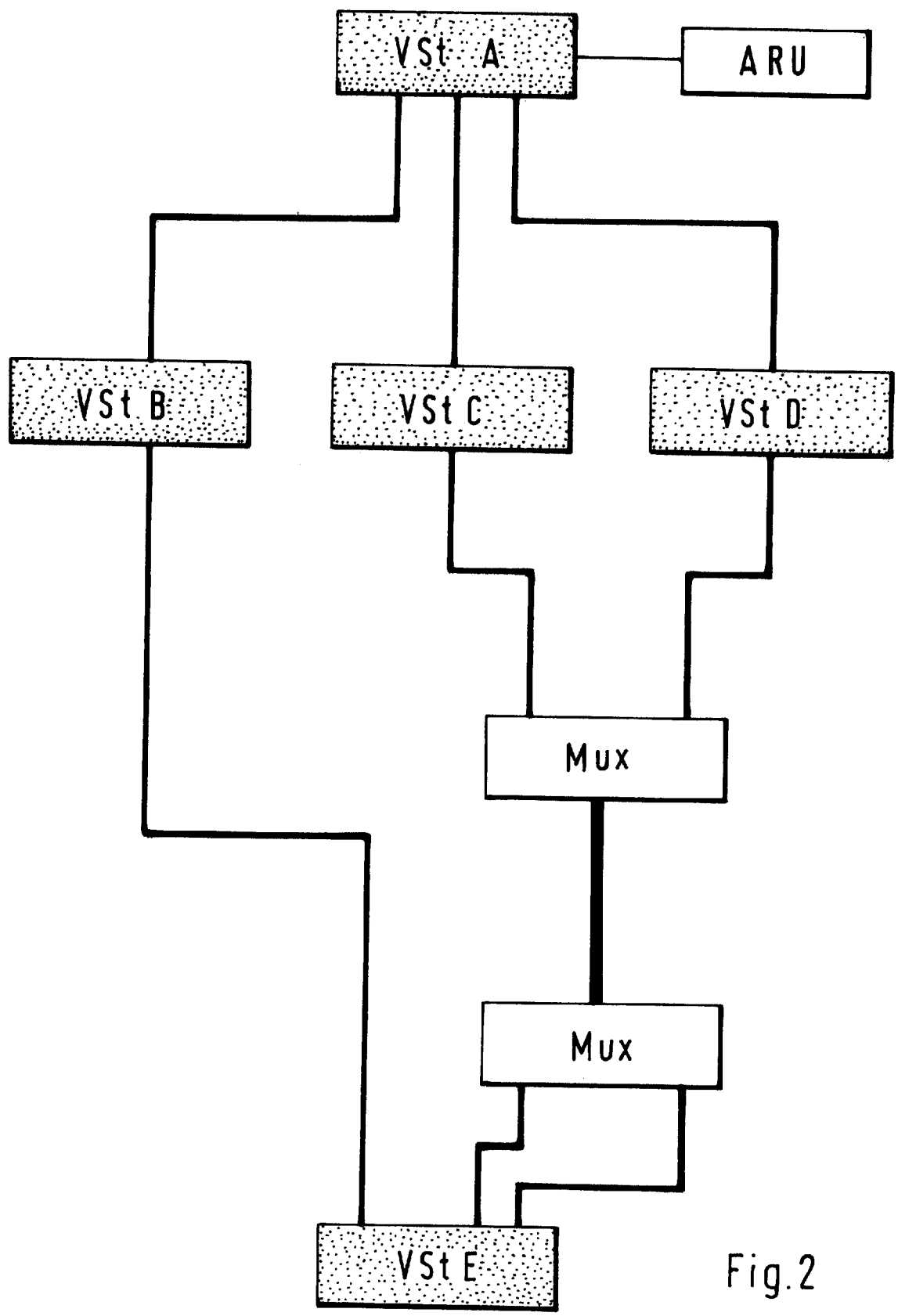
FIG. 2 shows the same part of the switched telecommunication network according to the invention, but from a transmission point of view.

This is where the invention comes in. Today, the paths between two exchanges are frequently not simply continuous cables, which may be lengthened by splicing. In many cases, in order to make use of synergy effects, two paths which extend at least partly together are also combined from a transmission point of view. In the example, as shown in FIG. 2, a part of the path between the exchange VStC and the exchange VStE and a part of the path between the exchange VStD and the exchange VStE are identical and are therefore combined at both ends by multiplexers Mux. There are various reasons for such combinations, which will not be considered here. It should be pointed out that such combinations may also be dynamic. By so-called cross-connects, the transmission means (lines, radio links, . . . ) can be assigned or distributed to different suitable connections as required.

Assuming that an attempt to achieve a connection from the exchange VStA via the exchange VSTC to the exchange VStE has failed, it is obvious that a further attempt via the exchange VSTB is more likely to be successful than an attempt via the exchange VStD. According to the invention, therefore, the path via the exchange VStD is not selected on the next attempt, because this path is partly identical with the path via the exchange VStD, which was blocked on the previous attempt.

This reduces the number of possibilities or alternative paths. If necessary, provision must be made for further alternative paths as a compensation.

In practice, the selection of a path for a call attempt is based on routing data, which are usually combined in routing tables. In FIG. 2, these routing tables are shown as the routing facility ARU at the exchange VStA. These routing data are available in each present-day exchange for all those connections which originate from this exchange. In principle, the routing data and the routing tables could also be separate from the exchanges. The fact that individual paths are only conditionally available must now be taken into account in creating the routing data and routing tables.

This can be accomplished, for example, by providing only one of these paths at a time as an alternative path. It is also possible to define a suitable sequence of queries or use suitable subqueries in order to ensure that two partially identical paths will not be selected for call attempts in direct succession.

The design of the switched telecommunication network according to the invention not only reduces the probability of blocking but also permits more exact planning.

What is claimed is:

1. A switched telecommunication network comprising several exchanges (VStA, VStB, VStC, VStD, VStE) which are directly or indirectly interconnected such that at least between individual pairs of exchanges (VStA/VStE), more than two paths (VStA-VStB-VStE, VStA-VStC-VStE, VStA-VStD-VStE) are possible, and further comprising at least one routing facility (ARU) which decides on the selection of the respective path to be used for each connection to be established and which does not select a path if it was blocked on the previous attempt, characterized in that the routing facility (ARU) is designed not to select a path if said path is identical in at least one section (Mux-Mux) with a path which was blocked on the previous attempt, wherein the routing facility (ARU) will avoid said path which was blocked even if the at least one section was possibly unblocked on the previous attempt.

2. A method of establishing a switched connection in a switched telecommunication network comprising several exchanges (VStA, VStB, VStC, VStD, VStE) which are directly or indirectly interconnected such that at least between individual pairs of exchanges (VStA/VStE), more than two paths (VStA-VStB-VStE, VStA-VStC-VStE, VStA-VStD-VStE) are possible, and further comprising at least one routing facility (ARU) which decides on the selection of the respective path to be used for each connection to be established and which does not select a path if it was blocked on the previous attempt, characterized in that the routing facility (ARU) does not select a path if said path is identical in at least one section (Mux-Mux) with a path which was blocked on the previous attempt, wherein the routing facility (ARU) will avoid said path which was blocked even if the at least one section was possibly unblocked on the previous attempt.

3. An exchange for a switched telecommunication network comprising several exchanges (VStA, VStB, VStC, VStD, VStE) which are directly or indirectly interconnected such that at least between said exchange (VStA) and another exchange (VStE), more than two paths (VStA-VStB-VStE, VStA-VStC-VStE, VStA-VStD-VStE) are possible, and further comprising a routing facility (ARU) which decides on the selection of the respective path to be used for each connection to be established and which does not select a path if it was blocked on the previous attempt, characterized in that the routing facility (ARU) is designed not to select a path if said path is identical in at least one section (Mux-Mux) with a path which was blocked on the previous attempt, wherein the routing facility (ARU) will avoid said path which was blocked even if the at least one section was possibly unblocked on the previous attempt.

4. A routing facility (ARU) for a switched telecommunication network comprising several exchanges (VStA, VStB, VStC, VStD, VStE) which are directly or indirectly interconnected such that at least between individual pairs of exchanges (VStA/VStE), more than two paths (VStA-VStB-VStE, VStA-VStC-VStE, VStA-VStD-VStE) are possible, the routing facility (ARU) being associated with at least one of the exchanges (VStA) and designed to decide on the selection of the respective path to be used for each connection to be established and not to select a path even if it was blocked on the previous attempt, characterized in that the routing facility (ARU) is designed not to select a path if said path is identical in at least one section (Mux-Mux) with a path which was blocked on the previous attempt, wherein the routing facility (ARU) will avoid said path which was blocked even if the at least one section was possibly unblocked on the previous attempt.

5. A switched telecommunication network as claimed in claim 1, characterized in that where two possible paths are identical in sections, the number of paths that can be used as alternative paths is increased.

* * * * *